Feb. 19, 1924.

J. A. AHLFORS 1,484,456

TIRE BUILDING MACHINE

Filed March 11, 1921

Inventor

J. A. Ahlfors.

By Frease, Merkel, Saywell

Attorneys

Feb. 19, 1924.

J. A. AHLFORS

TIRE BUILDING MACHINE

Filed March 11, 1921  7 Sheets-Sheet 6

1,484,456

Inventor
J. A. Ahlfors.

Patented Feb. 19, 1924.

1,484,456

UNITED STATES PATENT OFFICE.

JOHN AXEL AHLFORS, OF CANTON, OHIO, ASSIGNOR TO THE KNIGHT MANUFACTURING COMPANY, OF CANTON, OHIO, A CORPORATION OF OHIO.

TIRE-BUILDING MACHINE.

Application filed March 11, 1921. Serial No. 451,496.

*To all whom it may concern:*

Be it known that I, JOHN AXEL AHLFORS, a citizen of Finland, residing at Canton, in the county of Stark and State of Ohio, have invented a new and useful Tire-Building Machine, of which the following is a specification.

This invention relates to tire building machines for forming the outer casing of pneumatic tires such as are used upon automobiles and similar vehicles.

Machines of this general character which are at present in use, are provided with different means for placing a tension upon the fabric, from which the casing is formed, as the fabric is laid upon the rotating core upon which the casing is built.

In the usual form of tire building machine the tension is placed upon the fabric by a friction brake upon a roll over which the fabric is passed as it is fed to the core, and there is no way of determining the percentage of stretch given to the fabric by this method, as the tensile qualities of the fabric are affected by weather conditions, thus allowing the fabric to be stretched more or less than is desired with the same amount of tension.

While attempts have been made to produce a uniform stretch in the fabric as it is fed to the core, regardless of the amount of tension necessary to provide this stretch, the machines which have been provided to accomplish this purpose have depended upon a friction pulley which frictionally engages the periphery of the core to control the tension mechanism by means of which the fabric is stretched, and as there is always a possibility of the friction pulley slipping while in operation, it will be seen that machines of this general character do not provide a positive means for applying a definite amount of stretch to the fabric as it is applied to the core.

The objects of the present invention are to provide a tire building machine by means of which any desired percentage of stretch may be given to the fabric as it is placed upon the core, and in which positive means are provided for applying a given amount of stretch to the fabric and for varying the amount of stretch as may be required, other objects being to provide a machine of this character by means of which tire casings may be rapidly and efficiently manufactured.

The above and other objects are attained by providing a tire building machine of the character referred to provided with a rotatable core and means for driving the same, a feed roll for feeding the fabric to the core, and a positive driving connection between the core and the feed roll to rotate the feed roll at a slower speed than the core in order to stretch the fabric between the core and the feed roll, means being provided for varying the speed of the feed roll with reference to that of the core in order to give greater or less stretch to the fabric.

In the accompanying drawings—

Similar numerals of reference indicate corresponding parts throughout the several figures of the drawings.

The base upon which the machine is mounted is indicated by the numeral 1 and the rotating core is mounted in any suitable and well known manner upon said base, means being provided for applying power to the core to rotate the same.

The power means and the means of mounting the core are not included in the present invention and therefore are not illustrated, and the core is illustrated diagrammatically, being represented by the circle 2.

The column upon which is mounted the mechanism for feeding the fabric to the core is mounted upon the base 1 and indicated by the numeral 3.

A sprocket 4 is mounted upon the shaft 5 of the core and connected by means of a chain 6 with a sprocket 7 mounted upon the shaft 8, said shaft being journaled in a bearing 9 supported at one side of the column 3. The shaft 8 is also journaled in a bearing 10 formed in a bracket 11 which is supported at one side of the column 3.

A sprocket 12 is also fixed upon the shaft 8 and connected by means of the chain 13 with a sprocket 14 mounted upon the pulley 15 which is journaled in suitable bearings provided in the bracket 11 and connected by means of a belt 16 with a similar pulley 17 journaled in suitable bearings formed in a bracket 18 which is also supported from the column 3.

Figures 17, 18, 19, 20, 21, 22, 23, 24, 25, 26, 27, 28, 29, 30, 31, 32:
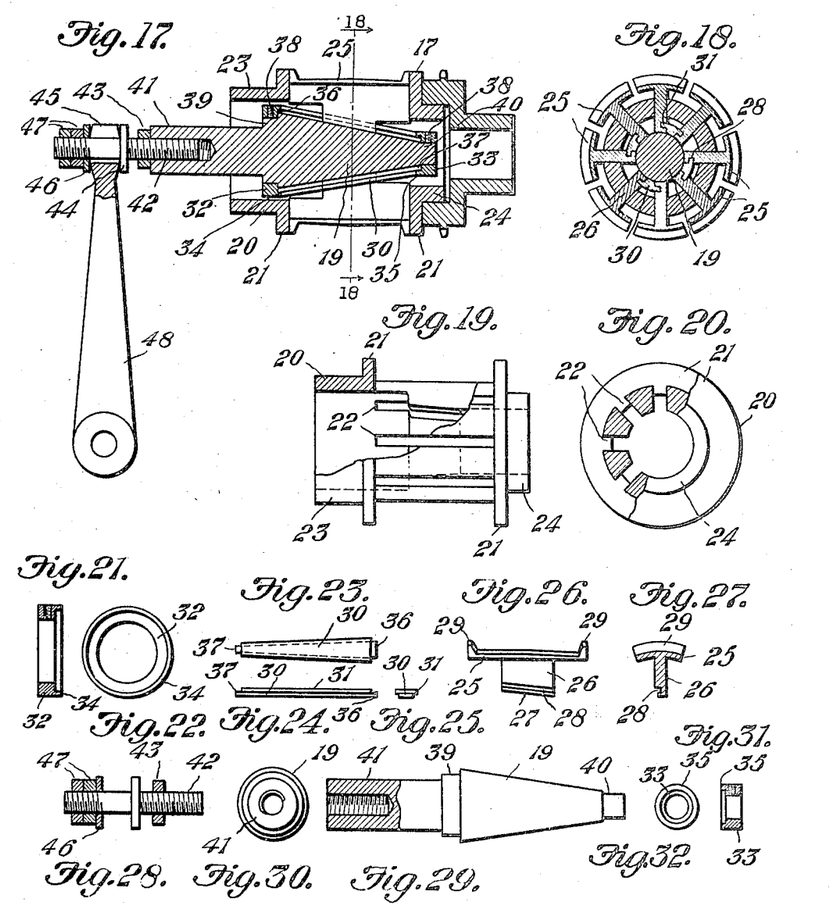
Fig. 17 is a longitudinal sectional view through one of the feed pulleys and adjusting cones showing the connection of the same to the cone shifting lever.
Fig. 18 is a section on the line 18—18, Fig. 17.
Fig. 19 is a side elevation with parts broken away of the feed pulley hub.
Fig. 20 is an end view with parts broken away of the same.
Fig. 21 is a transverse sectional view of the collar at the large end of the adjusting cone.
Fig. 22 is an end elevation of the same.
Fig. 23 is a plan view of one of the feed cone keys.
Fig. 24 is an edge view of the same.
Fig. 25 is an end view of the same
Fig. 26 is a side elevation of one of the rim segments of the pulley.
Fig. 27 is a transverse section of the same.
Fig. 28 is an elevation partly in section of the adjusting stud which connects the adjusting cone to the lever.
Fig. 29 is a side elevation partly in section of the cone.
Fig. 30 is an end view of the same.
Fig. 31 is a transverse section through the collar at the small end of the cone.
Fig. 32 is an end view of the same.

The pulleys 15 and 17 are similarly constructed and each is an expansible pulley arranged to be expanded by means of a cone 19. Each of the expansible pulleys includes a cylindrical drum 20 provided with the spaced annular flanges 21 between which are located the slots 22, a journal portion 23 being located at one end of the drum and a reduced portion 24 at the other end for the reception of the sprocket.

Each pulley comprises a plurality of rim segments 25, each provided with a web 26 which extends through one of the slots 22 in the pulley hub, the inner edge of said web being inclined as shown at 27 and provided with a groove 28, parallel with said inner edge. A flange 29 is formed at each end of each rim segment for the purpose of retaining the belt upon said rim segments.

The rim segments are connected together in pairs by means of the cone keys 30, each of these keys being tapered and provided with the longitudinal flanges 31 which are received within the grooves 28 of adjacent rim segments, the cone keys being mounted in spaced relation around the periphery of the cone 19, by means of the rings 32 and 33 which are provided with the annular flanges 34 and 35 respectively, which project over the reduced extremities 36 and 37 respectively of the keys, set screws 38 being provided to fixedly attach said rings upon the shouldered portions 39 and 40 of the cone.

Each of the cones 19 is provided with a reduced, internally threaded extension 41, which receives one extremity of the threaded adjusting stud 42, a jam nut 43 being provided upon said stud for locking the adjusting stud in any desired adjustment. A shoulder 44 is provided upon the adjusting stud intermediate the extremities thereof and arranged to be engaged by the bifurcated portion 45 of the adjacent arm of the cone adjusting lever, a washer 46 being located upon the stud and held in engagement with the other side of said bifurcated portion of the lever by means of nuts 47.

Figures 7, 8, 9, 10, 12:
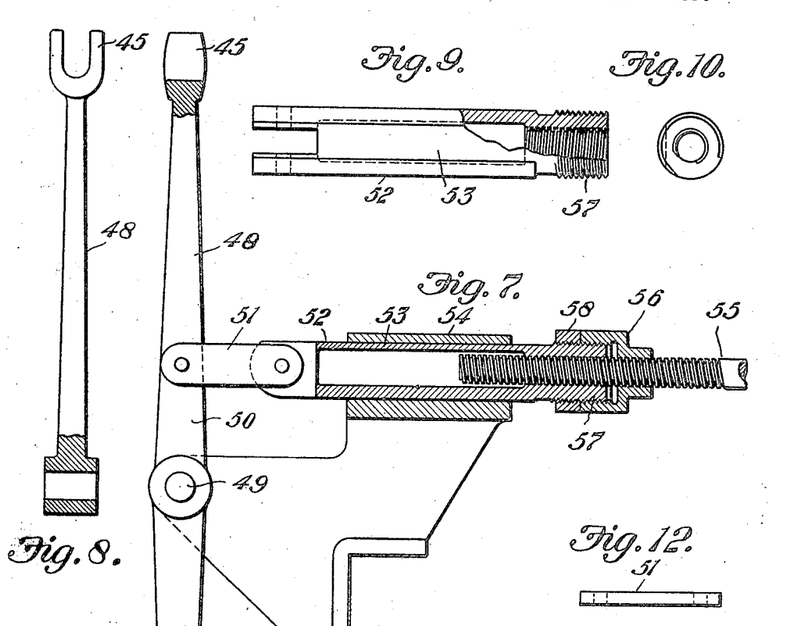
Fig. 7 is a side elevation of the cone adjusting lever bracket showing the cone shifting lever and the feed adjusting screw connected thereto.
Fig. 8 is an elevation of one of the arms of the cone shifting lever.
Fig. 9 is a side elevation of the feed adjusting nut, parts being broken away.
Fig. 10 is an end view of the same.
Fig. 12 is an edge view of the same.
Figure 11:
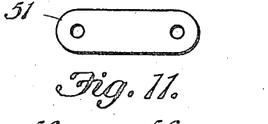
Fig. 11 is a side elevation of the link which connects the feed adjusting screw to the cone shifting lever.

The cone adjusting lever comprises a pair of similar arms 48 which are fixed upon the rock shaft 49, said rock shaft being journaled in suitable bearings supported from the bracket 11. A rock arm 50 is fixed upon the rock shaft 49 and connected by means of the links 51 with the feed adjusting nut 52, said nut having a cylindrical portion 53 which is slidably mounted in a bearing 54 supported from the bracket 11.

Figure 13:
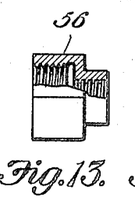
Fig. 13 is an elevation with parts broken away of the take-up nut upon the feed adjusting screw.
Figure 14:
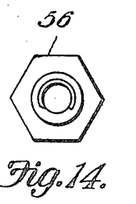
Fig. 14 is an end view of the same.
Figure 15:
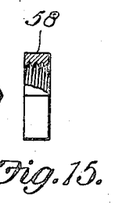
Fig. 15 is a side elevation, with parts broken away, of the lock nut upon the feed adjusting nut.
Figure 16:
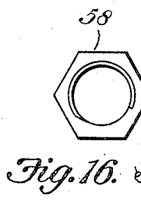
Fig. 16 is an end view of the same.

The feed adjusting screw 55 is threaded within the adjusting nut and a take-up nut 56 is threaded upon the screw and upon the threaded portion 57 of the feed adjusting nut, a jam nut 58 being also mounted upon the threaded portion 57 of the adjusting nut for the purpose of locking the take-up nut in any desired position.

The other end of the feed adjusting screw is rotatably mounted in the bearing 59, supported upon the column 3, a pinion 60 being fixed upon the outer end thereof. The pinion 60 meshes with the index gear 61 which is journaled upon the shaft 62, said shaft being journaled in suitable bearings 63 mounted upon the column 3.

Figure 33:
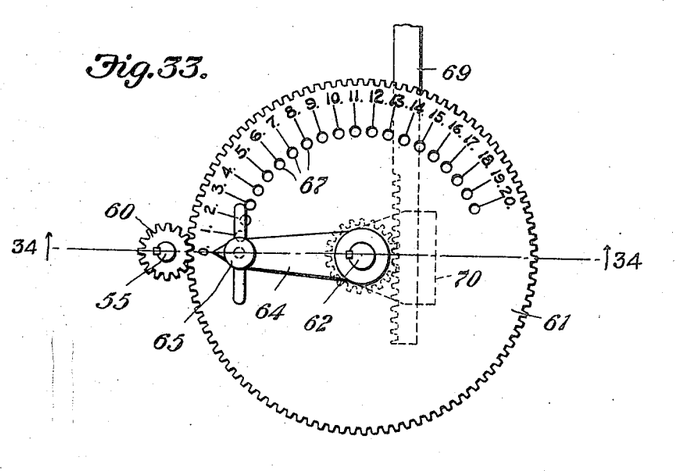
Fig. 33 is a side elevation of the index gear and index arm showing a portion of the slide rack.
Figure 34:
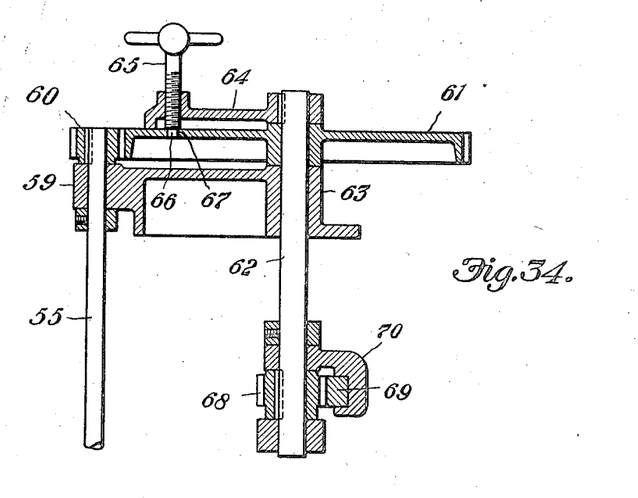
Fig. 34 is a section on the line 34—34, Fig. 33.

The index arm 64 is fixed upon the shaft 62 and provided with the screw threaded locking handle 65, which has a reduced end 66 arranged to be selectively engaged with any of the apertures 67 provided in the index gear, these apertures being twenty in number, as illustrated upon the drawings and indicating the percentage of tension or stretch produced upon the fabric when the index arm is moved into engagement therewith.

A rack pinion 68 is fixed upon the shaft 62 and meshes with a rack 69 slidably mounted in a rack guide 70, said rack being pivotally connected at 71 to the rack lever extension 72 which is mounted within the tubular portion 73 of the rack lever 74, a set screw 75 being provided for adjusting said extension within said tube.

The rack lever 74 is fixed upon the rock shaft 76, the feed adjusting arm 77 being also fixed upon said rock shaft and provided at its free extremity with the roller 78 arranged to engage the periphery of the core 2.

The feed roll bracket 79 is supported upon the upper end of the column 3 and extends over the core 2 and comprises the spaced arms 80 between which the shaft 81 of the feed roll 82 is journaled. A sprocket 83 is keyed upon one extremity of the feed roll shaft and is connected by means of a chain 84 with the sprocket 85 fixed upon the upper feed pulley 17.

The pressure roll frame 86 is fixedly mounted upon the rock shaft 87 which is journaled in suitable bearings 88, formed in the feed roll bracket, the pressure roll 89 being journaled in said frame and arranged to engage the periphery of the feed roll 82, a weight arm 90 being fixed upon the rock shaft 87 and having slidably mounted thereon an adjustable weight 91 adapted to hold the pressure roll in engagement with the feed roll.

An inclined table 92 extends upwardly from the rear side of the column 3 and terminates at a point adjacent the feed roll 82, being supported in any suitable manner as by the brace 93. This table is designed to support the strips of fabric used in the building of the tire casings, the strips being placed upon said table and fed between the feed roll and pressure roll to the core.

Figure 5:
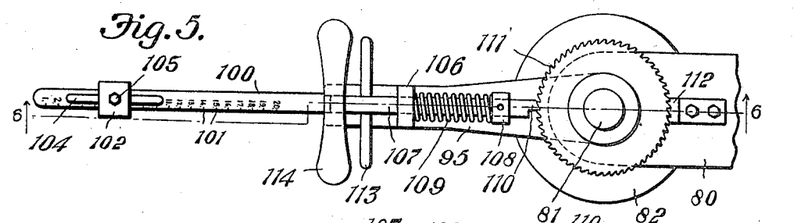
Fig. 5 is a side elevation of a portion of the feed roll arm and the pointer arm and pointer mounted thereon.
Figure 6:
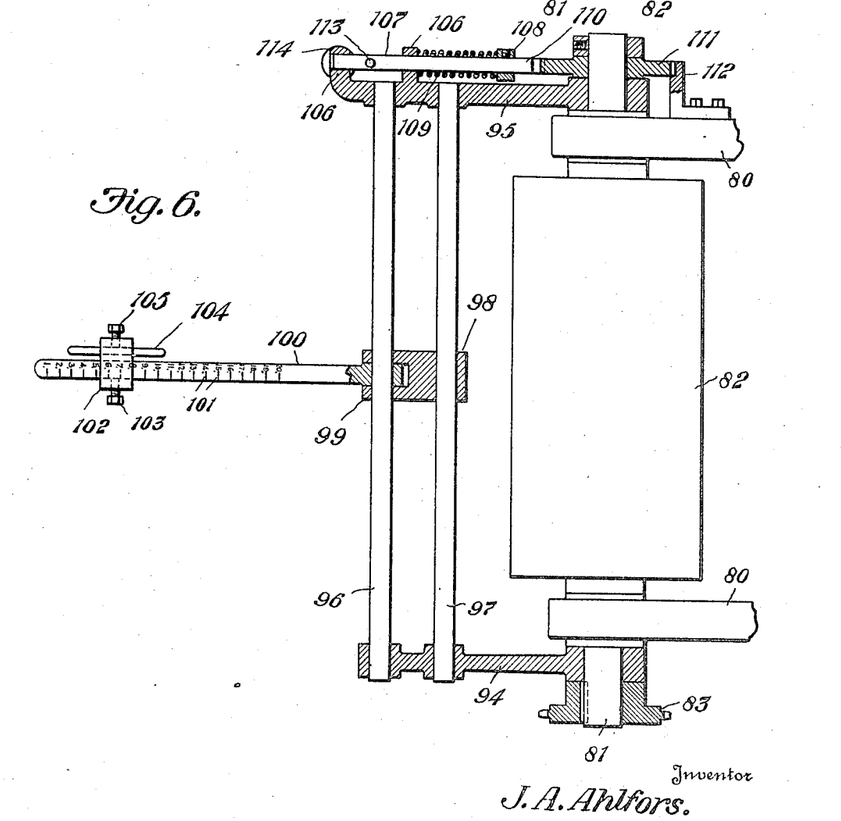
Fig. 6 is a section on the line 6—6, Fig. 5.

The pointer arms 94 and 95 are pivotally mounted upon the shaft 81 of the feed roll and are connected at their free ends by means of the spaced rods 96 and 97. The spacer 98 is mounted upon the rods 96 and 97 and provided with the bifurcation 99 within which is received the pivotal end of the pointer 100 which is pivoted upon the rod 96.

The pointer is provided with the spaced graduations from one to twenty indicated by the numeral 101, and has slidably mounted thereon the clamp block 102 arranged to be fixed in any desired position upon the pointer by means of a set screw 103. An adjustable pointer finger 104 is slidably mounted within the clamp block and arranged to be held in adjusted position by means of the set screw 105.

The pointer arm 95 is provided with the bearing portions 106 through which is slidably mounted the ratchet pin 107, provided with a collar 108, a spiral spring 109 being interposed between said collar and the adjacent bearing, tending to normally urge the pawl 110 into engagement with the ratchet 111 which is loosely mounted upon the shaft 81 and held against rotation therewith by means of the pawl 112.

A finger pin 113 is located through the ratchet pin 107 and arranged to be grasped with the fingers of the operator together with the fixed handle 114, upon the arm 95, in order to release the pawl 110 from the ratchet.

For the purpose of keeping the belt 16 taut, a curved arm 115 is pivoted at 116 upon the lower feed pulley bracket 11, a tension roller 117 being journaled in said arm and arranged to engage the surface of the belt, a counterweight 118 being provided on the other end of the curved arm for the purpose of providing the desired amount of tension upon the belt.

The bead rollers 119 are journaled upon the extremities of the arms 120 and provided with handles 121 for operating the same. The arms 120 are hinged at 122 upon the bar 123, said bar being mounted for vertical movement upon the guides 124, a set screw 125 being provided for holding the bar 123 in any desired adjustment.

The arms 120 may be adjusted vertically upon the bar 123 by means of the set screws 126. For the purpose of raising and lowering the bar 123, the rear face of said bar is provided with a rack portion 127 which meshes with the pinion 128, fixed upon the shaft 129, said shaft being journaled in suitable bearings in the feed roll bracket and provided with a squared extremity for the reception of a wrench or other suitable tool.

The operation of the machine is as follows; a core of proper dimensions to build a casing of the required size, is placed in position upon the machine in the usual manner, the periphery of the core engaging the roller 78, causing the rock arm 77 and rock lever 74 to be rocked, sliding the rack 69 through the guide 70, and by means of the pinion 68 rotating the shaft 62, rocking the index arm 64 and with it the index gear 61, the pinion 60 being in turn rotated, rotating the adjusting screw 55, and through the adjusting nut 53, rocking the cone adjusting lever, moving one cone out and the other cone in, thereby reducing the circumference of one of the feed pulleys and increasing the circumference of the other pulley.

In order to set the mechanism for the required amount of tension, the index gear 61 is then grasped firmly in one hand and the operator loosens the screw handle 65 upon the index arm, disengaging said screw handle from the index gear after which the index gear, being held by the operator against movement, the index arm is moved to the desired point to give the required tension and the screw handle is engaged with the adjacent aperture 67 in the index gear.

It will be seen that this movement of the index arm, will through the pinion 68 and rack 69, swing the rock lever 77 away from the periphery of the core. When the index gear is released, the weight of the arm 77 will move the same downwardly until the roller 78 thereon again engages the periphery of the core, this movement sliding the rack 69, and through the pinion 68 and index arm 64, rotating the index gear 61 and the pinion 60, adjusting the feed adjusting screw 55 and through the feed adjusting nut, shifting the cone shifting lever and further adjusting the cones 19 within the feed pulleys, expanding and contracting said pulleys respectively in the proper ratio to produce the desired tension.

Figure 1:
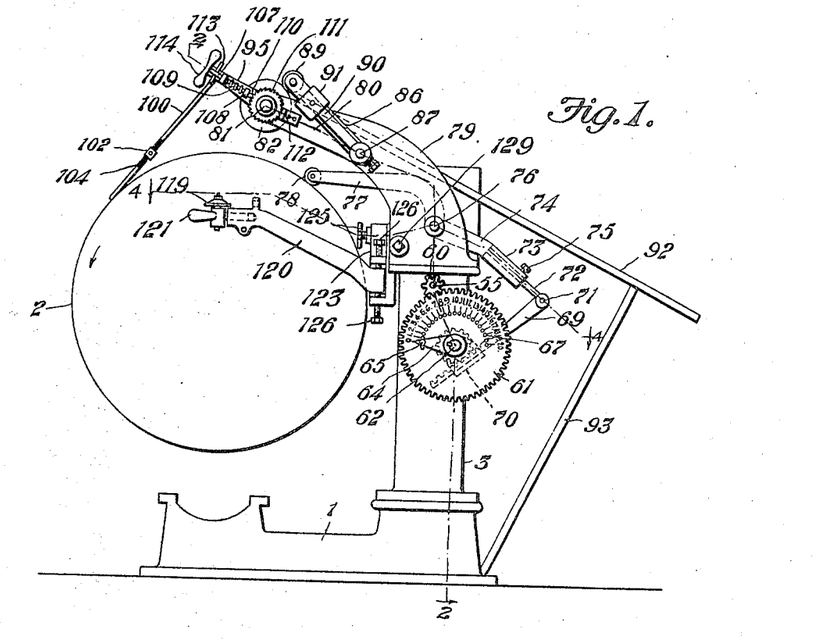
Figure 1 is a side elevation of a tire building machine embodying the invention.
Figure 3:
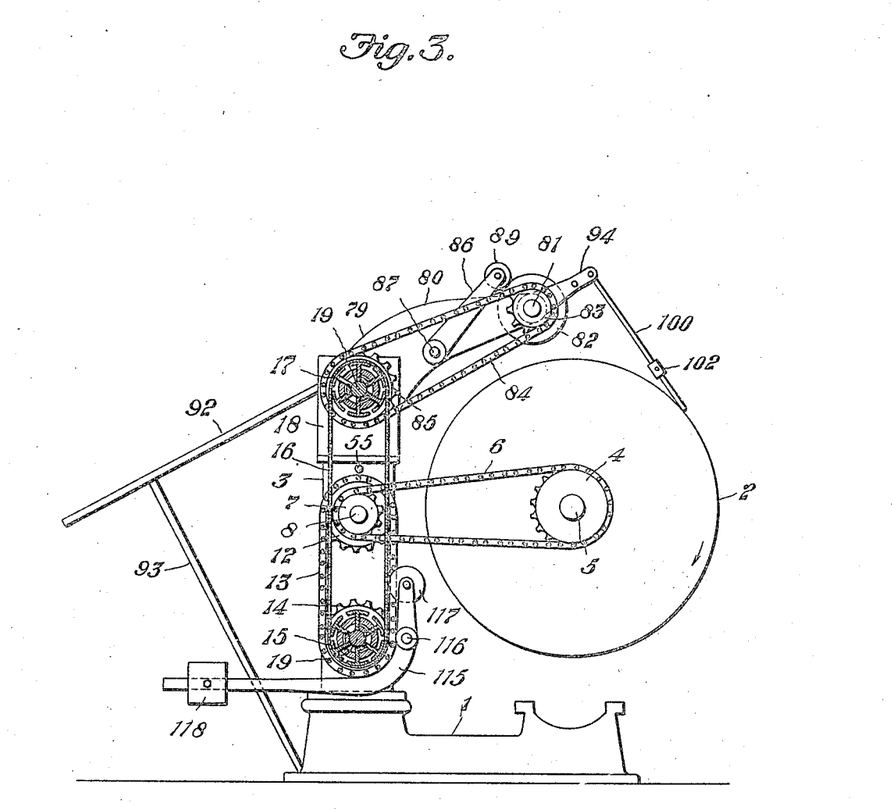
Fig. 3 is a section on the line 3—3, Fig. 2.
Figure 4:
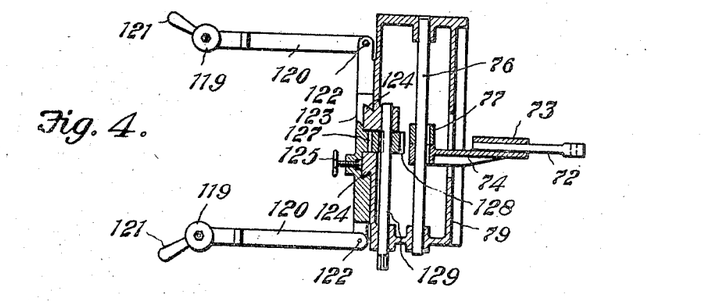
Fig. 4 is a section on the line 4—4, Fig. 1.

The block 102 and pointer finger 104 are then adjusted upon the pointer 100 to place the outer end of the finger 104 adjacent the graduation upon the pointer corresponding with the aperture upon the index gear which is engaged by the screw handle 65, and the pointer is swung downwardly into engagement with the periphery of the core, as shown in Figs. 1 and 3.

Figure 2:
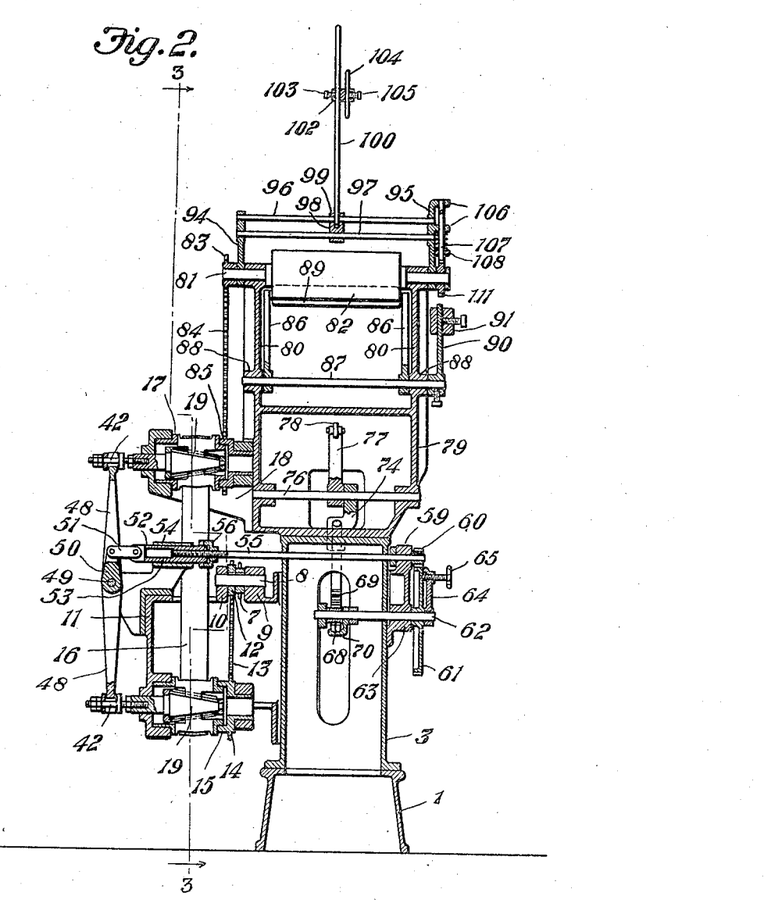
Fig. 2 is a section on the line 2—2, Fig. 1.

A strip of the fabric, from which the tire casings are built, is then passed between the feed roll 82 and the pressure roll 89, and extended outwardly until the end thereof registers with the outer end of the pointer finger. The fabric is then pulled until it has been stretched sufficiently to bring the end thereof to the outer end of the pointer, this end of the fabric being then placed upon the core and the pointer swung upward into the position shown in Fig. 2. This produces the proper amount of stretch in the initial end of the fabric.

The power means is then put into operation, rotating the core in the direction of the arrow shown on Figs. 1 and 3, stretching the fabric between the feed roll 82 and the point where it engages the core.

It will be seen that since the core rotates at a uniform speed and the speed of the feed roll is governed by the adjustment of the feed pulleys, the fabric is stretched the required percentage between the feed roll and the core, and since the feed roll is geared positively to the core, this percentage of stretch in the fabric will be uniform with any adjustment, there being no slipping of the feed roll with reference to the core, the ratio of speed of the feed roll and core being uniform.

As the circumference of the casing is increased, due to the placing of the successive layers of fabric thereon, the roller 78 engaging the periphery thereof, will cause the rock arm 77, to be rocked and through the rack 69 and pinion 68 and the index gear 61 and pinion 60 will operate the feed screw 55, changing the adjustment of the feed pulleys through the cone shifting lever and cones, always maintaining the same percentage of stretch in the fabric as it is fed to the core.

I claim:—

1. A tire building machine comprising a feed roll over which a sheet of fabric is arranged to to be passed, a power driven annular core for drawing the sheet fabric from said feed roll, gearing operatively connecting said feed roll to the core to cause positive rotation of the feed roll at a relative speed with the core to stretch the fabric, and a rock arm engaging the core and operatively connected to the gearing for automatically varying the speed of the feed roll.

2. A tire building machine comprising a feed roll over which a sheet of fabric is arranged to be passed, a power driven annular core for drawing the sheet fabric from said feed roll, gearing operatively connecting said feed roll to the core to cause positive rotation of the feed roll at a relative speed with the core to stretch the fabric and means engaging the core and operatively connected to the gearing for changing the relative speed of the feed roll to vary the stretch in the fabric.

3. A tire building machine comprising a feed roll over which a sheet of fabric is arranged to be passed, a power driven annular core for drawing the sheet fabric from said feed roll, gearing operatively connecting said feed roll to the core to cause positive rotation of the feed roll at a relative speed with the core to stretch the fabric, expansible pulleys in said gearing and means controlled by the size of the tire being built upon the core for expanding and contracting said pulleys for changing the relative speed of the feed roll to vary the stretch in the fabric.

4. A tire building machine comprising a feed roll over which a sheet of fabric is arranged to be passed, a power driven annular core for drawing the sheet fabric from the said feed roll, gearing operatively connecting said feed roll to the core to cause positive rotation of the feed roll at a relative speed with the core to stretch the fabric and means controlled by the size of the tire being built upon the core for automatically controlling said gearing to change the speed of the feed roll as the tire being built upon the core increases in size, to maintain a uniform stretch in the fabric.

5. A tire building machine comprising a feed roll over which a sheet of fabric is arranged to be passed, a power driven annular core for drawing the sheet fabric from said feed roll, gearing operatively connecting said feed roll to the core to cause positive rotation of the feed roll at a relative speed with the core to stretch the fabric and means controlled by the size of the tire being built upon the core for automatically operating said gearing to change the speed of the feed roll as the tire being built upon the core increases in size, maintaining a uniform stretch in the fabric.

6. A tire building machine comprising a feed roll over which a sheet of fabric is arranged to be passed, a power driven annular core for drawing the sheet fabric from said feed roll, gearing operatively connecting said feed roll to the core to cause positive rotation of the feed roll at a relative speed with the core to stretch the fabric, variable speed pulleys in said gearing and automatic means controlled by the size of the tire being built upon the core for adjusting said variable speed pulleys as the tire being built upon the core increases in size in order to maintain a uniform stretch in the fabric.

7. A tire building machine including a feed roll, over which a sheet of fabric is arranged to be passed, a power driven annular core for drawing the sheet fabric from the said feed roll, gearing operatively connecting said feed roll with the core whereby the feed roll is positively driven at a relative speed with the core to stretch the fabric, variable speed pulleys in said gearing, a shifting lever controlling said pulleys and means for automatically operating said lever as the tire being built upon the core increases in size, to change the speed of the feed pulley and maintain a uniform stretch in the fabric.

8. A tire building machine including a feed roll over which a sheet of fabric is arranged to be passed, a power driven annular core for drawing the sheet fabric from said feed roll, gearing operatively connecting said feed roll with the core whereby the feed roll is positively driven at a relative speed with the core to stretch the fabric, expansible pulleys in said gearing, cones for expanding and contracting said pulleys, a cone shifting lever and means for automatically operating said lever as the tire being built upon the core increases in size to change the speed of the feed roll and maintain a uniform stretch in the fabric.

9. A tire building machine including a feed roll over which a sheet of fabric is arranged to be passed, a power driven annular core for drawing the sheet fabric from said feed roll, gearing operatively connecting said feed roll with the core whereby the feed roll is positively driven at a relative speed with the core to stretch the fabric, variable speed pulleys in said gearing, a shifting lever controlling said pulleys and a rock lever engaging the periphery of the core and operatively connected to said shifting lever for automatically operating said shifting lever as the tire being built upon the core increases in size to change the speed of the feed pulley and maintain a uniform stretch in the fabric.

10. A tire building machine comprising a feed roll over which a sheet of fabric is arranged to be passed, a power driven annular core for drawing the sheet fabric from the feed roll, gearing operatively connecting said feed roll with the core whereby the feed roll is positively driven at a relative speed with the core to stretch the fabric, variable speed pulleys in said gearing, a shifting lever controlling said pulleys, a feed screw operatively connected to said shifting lever and an index mechanism operatively connected to said feed screw whereby the mechanism can be set to produce any desired percentage of stretch in the fabric.

11. A tire building machine comprising a feed roll over which a sheet of fabric is arranged to be passed, a power driven annular core for drawing the sheet fabric from the feed roll, gearing operatively connecting said feed roll with the core whereby the feed roll is positively driven at a relative speed with the core to stretch the fabric, variable speed pulleys in said gearing, a shifting lever controlling said pulleys, a feed screw operatively connected to the shifting lever, a pinion upon the feed screw and an index gear meshing with the pinion whereby the mechanism can be adjusted to produce any desired amount of stretch in the fabric.

12. A tire building machine comprising a feed roll over which a sheet of fabric is arranged to be passed, a power driven annular core for drawing the sheet fabric from the feed roll, gearing operatively connecting the feed roll with the core whereby the feed roll is positively driven at a relative speed with the core to stretch the fabric, variable speed pulleys in said gearing, a rotatable index gear provided with a plurality of sockets, means operatively connecting the index gear with the variable pulleys and an index arm for selective engagement with said sockets whereby the mechanism can be adjusted to produce any desired amount of stretch in the fabric.

13. A tire building machine comprising a feed roll over which a sheet of fabric is arranged to be passed, a power driven annular core for drawing the sheet fabric from said feed roll, gearing operatively connecting said feed roll to the core to cause positive rotation of the feed roll at a relative speed with the core to stretch the fabric and a lever operatively connected to the gearing and to the core for automatically varying the speed of the feed roll.

14. A tire building machine comprising a feed roll over which a sheet of fabric is arranged to be passed, a power driven annular core for drawing the sheet fabric from said feed roll, gearing operatively connecting said feed roll to the core to cause positive rotation of the feed roll at a relative speed with the core, to stretch the fabric, a lever operatively connected to the gearing and a rock arm operatively connected to the lever and engaging the core for automatically varying the speed of the feed roll.

In testimony that I claim the above, I have hereunto subscribed my name.

JOHN AXEL AHLFORS.